(12) United States Patent
Draper et al.

(10) Patent No.: US 7,320,836 B2
(45) Date of Patent: Jan. 22, 2008

(54) INTEGRAL AIR PREHEATER AND START-UP HEATING MEANS FOR SOLID OXIDE FUEL CELL POWER GENERATORS

(75) Inventors: Robert Draper, Pittsburgh, PA (US); Michael P. Jaszcar, Murrysville, PA (US); Paolo R. Zafred, Murrysville, PA (US); James E. Gillett, Greensburg, PA (US); Matthew Riggle, Ford City, PA (US)

(73) Assignee: Siemens Power Generation, Inc., Orlando, FL (US)

( * ) Notice: Subject to any disclaimer, the term of this patent is extended or adjusted under 35 U.S.C. 154(b) by 682 days.

(21) Appl. No.: 10/729,198

(22) Filed: Dec. 5, 2003

(65) Prior Publication Data

US 2005/0123808 A1  Jun. 9, 2005

(51) Int. Cl.
*H01M 8/00* (2006.01)
*H01M 8/04* (2006.01)
*H01M 8/10* (2006.01)
*H01M 2/00* (2006.01)
*H01M 2/14* (2006.01)

(52) U.S. Cl. ............... 429/13; 429/17; 429/26; 429/31; 429/34; 429/38

(58) Field of Classification Search .......... 429/13, 429/17, 26, 31, 34, 38
See application file for complete search history.

(56) References Cited

U.S. PATENT DOCUMENTS

| | | | |
|---|---|---|---|
| 3,718,506 A | * | 2/1973 | Fischer et al. ............ 429/24 |
| 3,972,731 A | | 8/1976 | Bloomfield et al. |
| 4,395,468 A | | 7/1983 | Isenberg |
| 4,664,986 A | * | 5/1987 | Draper et al. ............ 429/26 |
| 5,413,879 A | | 5/1995 | Domeracki et al. |
| 5,486,428 A | * | 1/1996 | Gardner et al. .......... 429/19 |
| 5,573,867 A | | 11/1996 | Zafred et al. |
| 2002/0110716 A1 | * | 8/2002 | Holmes et al. ........... 429/31 |
| 2003/0134174 A1 | * | 7/2003 | Akikusa et al. .......... 429/38 |

FOREIGN PATENT DOCUMENTS

WO   WO 02/54519   *   7/2002

OTHER PUBLICATIONS

Westinghouse Electric Corporation, Solid Oxide Fuel Cell . . . Power Generation of the Next Decade, report, Oct. 1992, 1-13.

* cited by examiner

*Primary Examiner*—Patrick Joseph Ryan
*Assistant Examiner*—Thomas H. Parsons

(57) ABSTRACT

A high temperature fuel cell generator (10) having a housing (12) containing a top air feed plenum (80), a bottom fuel inlet (54), a fuel reaction generator chamber (62) containing fuel cells (42) and a reacted fuel-reacted air combustion chamber (38) above the fuel reaction generator chamber (62), where inlet air (14) can be heated internally within the housing in at least one interior heat transfer zone/block (92) located between the reacted fuel-reacted air combustion chamber (38) and the air feed plenum (80).

17 Claims, 7 Drawing Sheets

INTEGRAL AIR PREHEATER AND START-UP HEATING MEANS FOR SOLID OXIDE FUEL CELL POWER GENERATORS

BACKGROUND OF THE INVENTION

1. Field of the Invention

This invention relates to preheating oxidant for a fuel cell power generator within the generator itself, simplifying the generator design and reducing costs by eliminating expensive high temperature metal manifolding and improving start-up methodology.

2. Description of the Prior Art

Fuel cell based, electrical generator apparatus utilizing solid oxide electrolyte fuel cells ("SOFC") arranged within a housing and surrounded by insulation are well known, and taught, for example, by U.S. Pat. No. 4,395,468 (Isenberg) and "Solid Oxide Fuel Cell", Westinghouse Electric Corporation, October 1992, for tubular SOFC. The tubular type fuel cells can comprise closed ended, axially elongated ceramic tube air electrode material, completely covered by thin film, ceramic, solid electrolyte material. The electrolyte layer is covered by cermet fuel electrode material, except for a thin, axially elongated, interconnection material.

Development studies of SOFC power plant systems have indicated the desirability of pressurized operations. This would permit operation with a coal gasifier as the fuel supply and/or use of a gas turbine generator as a bottoming cycle. Integration is thought commercially possible because of the closely matched thermodynamic conditions of the SOFC module output exhaust flow and the gas turbine inlet flow. One such pressurized system is described in U.S. Pat. No. 3,972,731 (Bloomfield et al.).

Usually the air/oxidant is externally pre-heated, as taught in U.S. Pat. No. 5,413,879 (Domeracki et al.), and also internally heated, by passing the air through a combustion chamber before entry into the interior of the fuel cell, as taught by Zafred et al. in FIG. 4 of U.S. Pat. No. 5,573,867. This is also shown in U.S. Pat. No. 4,664,986 (Draper et al.) where metal finned inserts were used within the air/oxidant feed conduits, within the combustion chamber/pre-heater section, to increase heat transfer.

Tubular ceramic solid oxide fuel cell generators operate in the temperature range 800° C. through 1000° C. Because the cells are of ceramic construction substantial temperature gradients must be avoided in order to prevent cracking. Consequently, the air which is delivered to the cells must be preheated to a temperature which is close to that of the generator operating temperature. The delivery of air at a temperature in the region of 700° C. is also essential from the viewpoint that the cell temperature must be maintained at a high enough level that the cells remain electrochemically active over their entire length.

When the means of preheating air is external to the generator the conduits and plena that are used to deliver the air to the generator must be constructed from refractory materials. High temperature metal alloys such as Inconel 601 or Inconel 617 (both Ni, Cr based metal alloys), and high alumina ceramics have consistently been the materials of choice. These materials are extremely expensive and in some cases they are difficult to fabricate.

Another difficulty with present practice is that the high operating temperature of the air delivery components precludes the creation of very effective seals such as might be feasible if the use of elastomers were possible. Consequently, a fraction of the air which is pumped by the blower leaks from the air plenum directly to the exhaust plenum and does not pass through the generator. This situation is wasteful of energy.

What is needed is an air preheating system which is an integral part of the generator so that the conduits and plena that are used to convey the air to the generator can be constructed from more conventional materials such as the common steels, plastics or fiberglass. Ducting would not need to be insulated. Furthermore, it is preferable that elements of the air delivery system can be very effectively sealed to prevent leakage of air from the air feed plenum to the exhaust plenum, thus ensuring that all of the air which is pumped has value in the electrochemical and thermal scheme. The existence of an integral air preheater which ensures the delivery of cool air to the module facilitates this objective.

What is also needed is a means of start-up heating which does not compromise the above stated advantages of an integral preheater. Preferably the start-up heater would serve also as a power dissipater to the SOFC generator, so that when the generator is off-line it can continue to operate at reduced power level in a self-heating mode. When the SOFC bundle, air preheater and start-up/power dissipater heating means is packaged in such a way as to promote modular constructions, fabrication cost can be reduced and inherent size scalability is promoted.

SUMMARY OF THE INVENTION

The above needs are met and problems solved by providing a high temperature solid oxide electrolyte fuel cell generator comprising: a housing containing a top air feed plenum, a bottom fuel inlet, a reaction chamber containing fuel cells, and a reacted fuel-reacted air combustion chamber above the reaction chamber; wherein inlet air can be heated internally within the housing in at least one interior heat transfer zone located between reacted fuel-reacted air combustion chamber and the air feed plenum. These internal heat transfer zones/blocks/sections, generally made of a ceramic can eliminate exterior heat exchanger exterior recuperation air heaters and expensive high temperature resistant metal conduits.

The above needs are also met and problems solved by providing a high temperature solid oxide fuel cell generator comprising: a source of air and a source of fuel; a top air feed plenum; a bottom fuel inlet plenum; a fuel electrochemical reaction chamber containing fuel cells; a recirculation chamber directly above the electrochemical reaction chamber in which a fraction of reacted and unreacted fuel are drawn into a recirculation loop; a chamber directly above the recirculation chamber wherein fuel combustion products and reacted air from within the cells combine to complete combustion of unreacted fuel; at least one interior heat exchanger zone in which the combustion products heat incoming air which is carried in ceramic air feed tubes; and a combustion products exhaust chamber which lies directly below the top air feed plenum.

The invention also resides in a high temperature, solid oxide electrolyte fuel cell generator comprising: 1.) a housing defining an air plenum containing open top ends of a plurality of air feed tubes; 2.) a source of air; 3.) a source of fuel; 4.) a pump for pumping air directly into the air entry plenum of the generator; 5.) a generator section within the bottom of the housing, containing a plurality of tubular fuel cells each open at its top end, each having an exterior fuel electrode and an interior air electrode with solid oxide electrolyte therebetween, where the generator section connects to a source of fuel, and the plurality of air feed tubes are inserted within the fuel cells so that the pumped air can contact the air electrodes; and 6.) a reacted fuel-reacted air combustion chamber at the top open end of the fuel cells; wherein the air passing through the air feed tubes can be heated internally within the housing in at least one interior heat transfer zone disposed between reacted fuel-reacted air combustion chamber and the air plenum.

The invention also resides in a method of operating a high temperature solid oxide electrolyte fuel cell generator which reacts feed fuel and feed oxidant at interior fuel cell surfaces comprising: (1) feeding oxidant into at least one interior heat transfer zone within the fuel cell generator through an oxidant feed tube; (2) contacting the oxidant feed tube within the at least one interior heat transfer zone with exhaust spent fuel and spent oxidant products; and then (3) exhausting cooled exhaust from the fuel cell generator. Here, the oxidant is not heated before entry into the fuel cell generator, resulting in substantial equipment and ducting savings and dramatically simplifying the design of the generator.

BRIEF DESCRIPTION OF THE DRAWINGS

For a better understanding of the invention, reference may be made to the preferred, non-limiting embodiments exemplary of the invention, shown in the following drawings, in which.

DESCRIPTION OF THE PREFERRED EMBODIMENTS

Figure 1:
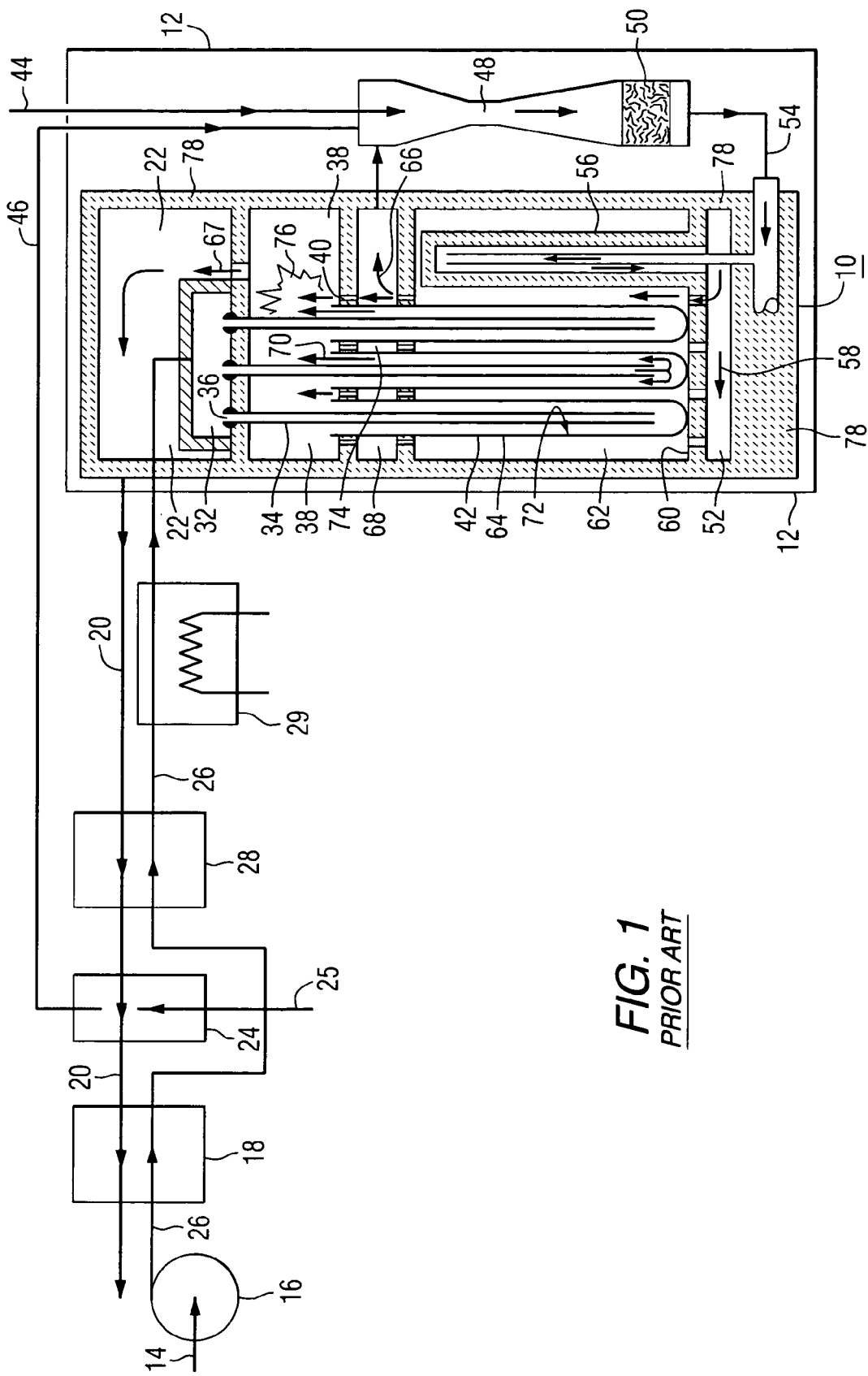
FIG. 1 shows a cross-sectional view of one type of prior-art solid oxide fuel cell generator with a variety of exterior recuperative air heaters, start up air heaters and interior Inconel air feed plenums.

The fuel cells used inside the generator apparatus of this invention can be solid oxide electrolyte of any type or configuration. However, for purposes of simplicity, tubular, solid oxide electrolyte fuel cells will be discussed as an exemplary type useful in this invention, and the description herein-after will generally relate to that type, which shall in no way be considered limiting as to the scope of the invention.

Solid oxide electrolyte fuel cells ("SOFC") are highly efficient devices that convert chemical energy into electricity. They operate at atmospheric or elevated pressures at a temperature of approximately 1000° C. to produce electricity using a variety of fossil fuels such as coal derived fuel gas, natural gas, or distillate fuel. The temperature of the exhaust gases from the cells is between 500° C. to 850° C., a temperature which is attractive for cogeneration applications or for use in bottoming cycles for all-electric central station power plants.

An operating SOFC readily conducts oxygen ions from an "air" electrode (electrode which air or oxidant contacts to an ionically conducting electronically nonconducting electrolyte which in turn contacts a "fuel" electrode (electrode which fuel contacts-anode). There they react with carbon monoxide (CO) and hydrogen ($H_2$) contained in the fuel gas to deliver electrons and produce electricity. The tubular SOFC features a porous air electrode made of doped lanthanum manganite. A gas-tight electrolyte of, for example, yttria-stabilized zirconia (approximately 40 micrometers thick) covers the air electrode, except in a strip about 9 mm wide along the entire active cell length. This strip of exposed air electrode is covered by a thin, dense gas tight layer of, for example, doped lanthanum chromite. This layer, termed the cell interconnection, serves as the electric contacting area to an adjacent cell or to a power contact. The fuel electrode is a generally nickel-zirconia cermet and covers the electrolyte surface except in the vicinity of the interconnection.

For operation, gaseous oxidant, typically air is introduced into the fuel cell, generally through an air feed tube. The terms "oxidant" and "air" are used interchangeably here. The air, discharged near the closed end of the cell, flows through the annular space formed by the cell and coaxial feed tube. Gaseous fuel flows on the outside of the cell. Typically, 85% of the fuel is electrochemically utilized (reacted) in the active fuel cell section resulting in spent fuel. The gas-impervious electrolyte does not allow nitrogen to pass from the air side to the fuel side, hence the fuel is oxidized in a nitrogen free environment, averting the formation of $NO_x$. At the open end of the cell, the remaining fuel is reacted with the air stream exiting the cell, reacted spent air, thereby providing additional useful heat. Reformation of natural gas and other fuels containing hydrocarbons can be accomplished, if desired, externally or within the generator. Incoming fuel can be reformed to $H_2$ and CO within the generator, eliminating the need for an external reformer.

To construct an electric SOFC generator, individual cells are bundled into an array of series-parallel electrically connected fuel cells, forming a structure that is a basic generator building block. The individual bundles are arrayed in series to build generator voltage and to form submodules. The parallel electrical connection of the cells within a bundle enhances generator reliability. Submodules are further combined in either parallel or series connections to form the generator module. For a more complete description of tubular feed cells and their operation in a generator apparatus, reference can be to U.S. Pat. No. 4,395,468 (Isenberg).

Referring now to FIG. 1 of the drawings, one type of SOFC generator 10 is shown within housing 12. Here, ambient air/oxidant 14 is passed through an air feed blower 16 into a first stage recuperation air heater 18, counter current to a hot exhaust stream 20 exiting from exhaust plenum 22 through steam generator 24 for boiling water 25. The heated air/oxidant then passes through air delivery conduit 26 to a second stage countercurrent recuperation air heater 28, then through a third heater 29, fuel fired burner or electrically energized heater (shown).

The hot air/oxidant passes through housing 12, into the SOFC generator 10, through exhaust plenum 22 and into a high temperature resistant metal (such as Inconel) air feed plenum 32 having alumina air feed tubes 34, preferably held in place with spherical ball seat seals, with air feed openings 36 generally at the bottom of the air feed plenum. The air passes into the openings 36 of the air feed tubes 34 and is further heated in a spent fuel-spent air combustion chamber 38 with hot exhaust openings 40 passing the hot exhaust into the adjacent exhaust plenum 22.

As is well known air passes through the air feed tubes to the bottom, closed interior of a plurality of fuel cells 42. Fuel feed 44, along optionally with recirculated exhaust 46, into an ejector pump 48, through a fuel pre-reformer 50 and into a fuel feed plenum 52 between the fuel cells 42. Previous to entering the fuel feed plenum 52, the pre-reformed fuel 54 can pass through an internal stack reformer 56 associated with each stack/grouping/bundle of fuel cells.

The reformed fuel 58 then passes through the bottom insulation board 60 of the generator section 62, containing the fuel cells 42 and upwards along the exterior fuel electrode portion 64 of the fuel cells, reacting as it progresses upwards to provide spent fuel 66. The spent fuel passes into spent fuel recirculation chamber 68, where part can be recirculated to ejector pump 48 and the rest fed into the combustion chamber 38 where spent fuel 66 combusts with reacted spent air 70 passing up the inside of the fuel cells 42 reacting at the interior air electrode surface 72 and passing through the fuel cell openings 74 to combust with spent fuel, as shown by combustion point 76. Insulation is generally shown as 78. The previous identification numbers will be used in subsequent drawings.

Figure 2:
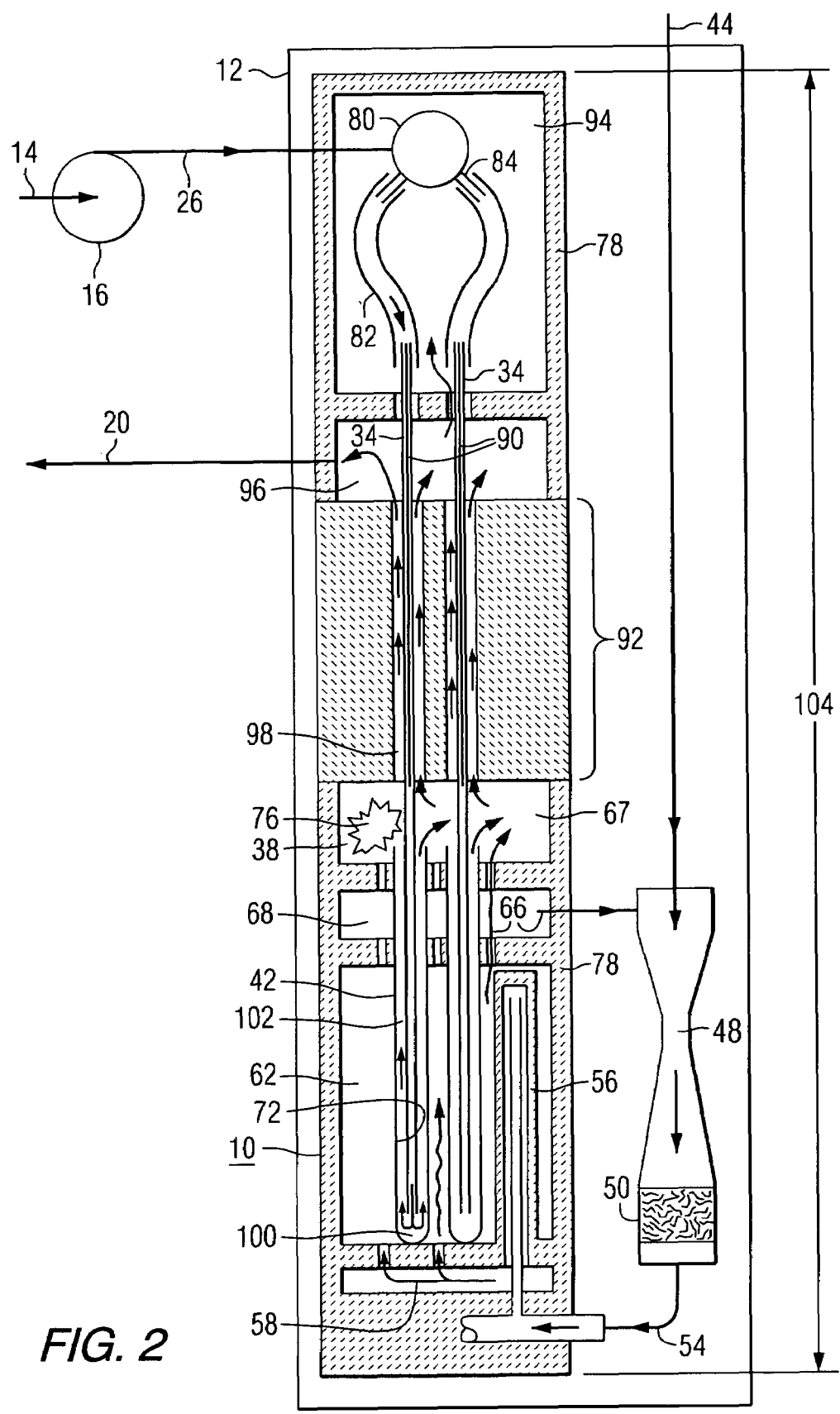
FIG. 2, shows a cross-sectional view of one embodiment of the invention featuring integrated recuperative air preheaters, low temperature air delivery components, low cost sealed elastomers, initial air feed plenums, and optional air feed tube radiation fins.

The following describes various new and dramatic features of the invention wherein an interior, ceramic heat transfer zone 92 in FIG. 2, is described that is close coupled to a solid oxide fuel cell generator and preheats incoming air through the use of the heat content of the generator exhaust stream. This means of preheating would replace conventional practice, in which the preheater is external to the generator, to the benefit that air fed ducting operates at near ambient temperature and can be fabricated from less costly materials, and the option exists to seal the air feed system against wasteful leakage of air by the use of elastomeric seals. The proposed integral SOFC bundle/recuperative air preheater module facilitates modular construction of the SOFC generator. This is beneficial in terms of construction cost and size scalability. Several means of start-up heating are described that are synergisting to the close coupled preheater concept. Some of these permit the use of the start-up heater as a dissipater of the power produced by the SOFC generator during off-grid periods. The generator is thus maintained at high temperature and thermal cycles are avoided.

We will now discuss variants of the invention shown in FIGS. 2, 3, 4 and 5. In all these variants, air 14 at room temperature is pumped by a blower 16 and passes thru a conduit 26 which is fabricated from carbon steel, plastic, or fiberglass and which requires no insulation.

In he variant illustrated by FIG. 2, the air feed conduit 26 discharges into low temperature air manifold feed plenum 80 which is constructed from carbon steel, plastic or fiberglass or depending upon the size of the generator or into a number of such manifolds. Flexible air feed transport tubes 82, preferably of silicon rubber or an equivalent elastomeric material, connect in a sealed manner between each port 84 of the manifold and an alumina or mullite air feed tube 34 which delivers air to a plurality of SOFC 42 of tubular or multiple passage form. These flexible tubes 82 are considered an extension of the mullite feed tubes 34. In this variant it is preferable to allow the manifold chamber 94 which contains the manifold(s) and the rubber tabulations to be filled with exhaust gas from an exhaust gas chamber 96 which, by virtue of the fact that the exhaust gas is stagnant and will exist at a low temperature. Metallic heat conducting inserts 90, such as stainless steel or Inconel radiation fins or ribbon is also shown, interior to the air feed tubes 34 to allow more effective heating in the interior heat transfer zone 92. Within the 92 there are annular passages 98 for heat transfer passage of the combusted exhaust products 67.

The interior heat transfer zone 92 will constitute from about 10% to about 20%, preferably from about 12% to about 17% of the length 104 of the SOFC generator 10, and is preferably made from a ceramic such as fibrous alumina, which has excellent tolerance of an oxidizing environment at temperatures up to 1000° C. Since the recuperative heat exchanger 92 operates mostly at a steady state heat capacity, parameters such as density and specific heat are not important. Because heat conduction within the structure is minimal thermal conductivity is not important. High emissivity is important since the structure radiates heat to the air feed tubes 34.

As can be seen in FIG. 2 ambient oxidant/air 14 is passed into the generator 10 by, for example, blower 16 via air delivery conduit 26, passing into low temperature manifold 80 made from low temperature materials—useful below about 800° C. or even lower, that is, common steel or, preferably, plastic, fiberglass or the like, in manifold chamber 94, thence via flexible air transport tubes 82 into air feed tubes 42, generally made of a ceramic such as mullite and possibly containing interior metallic inserts 90 for heat transfer purposes. The air continues to the bottom of the SOFC's 42 where it reverses flow at point 100 and passes upward, within the annular space 102 between the air feed tube 34 and the air electrode, along air electrode surface 72 to provide spent air which reacts with spent fuel 66 in combustion chamber 38. The feed fuel 44 passes through a variety of reforming means 50, 56 and the reformed fuel 58 passes up the outside exterior fuel electrode 64 of the SOFC's 42, within the generator section 62, to recirculation chamber 68 and combustion chamber 38, much as previously discussed in FIG. 1.

Figure 3:
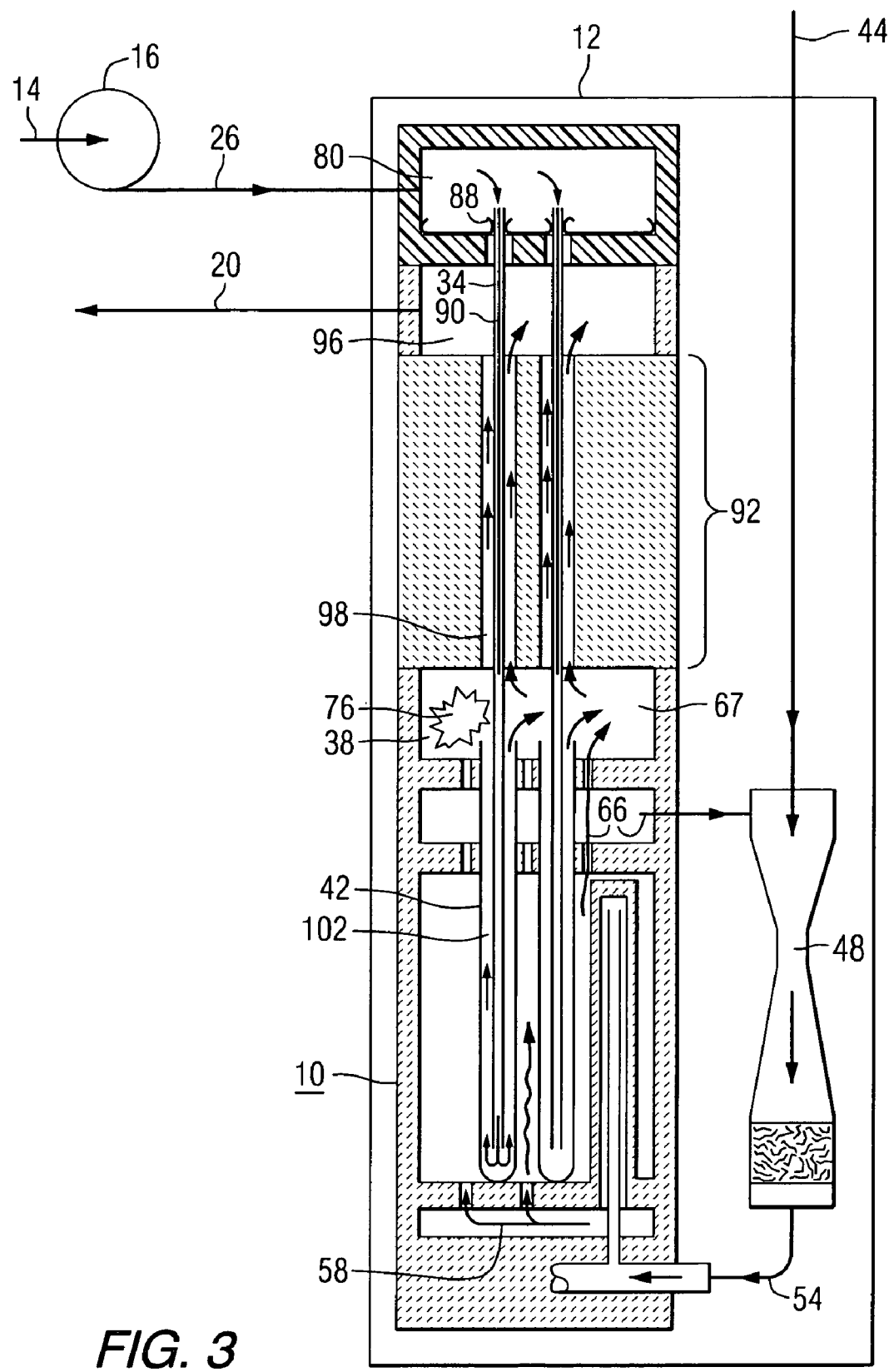
FIG. 3 shows a cross-sectional view of optional, inexpensive elastomeric sheet sealing of air feed tubes.

In FIG. 3, an air feed conduit 26 discharges into a low temperature air feed manifold/plenum, which encompasses a large chamber here, which might be fabricated from common steel, plastic, or fiberglass. A sheet of silicon rubber or an equivalent elastomeric material 88 forms the base face of the air feed plenum and is penetrated by alumina or mullite air feed tubes 34 in a manner which forms an effective seal between the silicon rubber sheet ad the air feed tube. Alternatively, rubber grommets (not shown) can be secured within the base plate of the plenum and make an effective seal to the air feed tubes.

Figure 4:
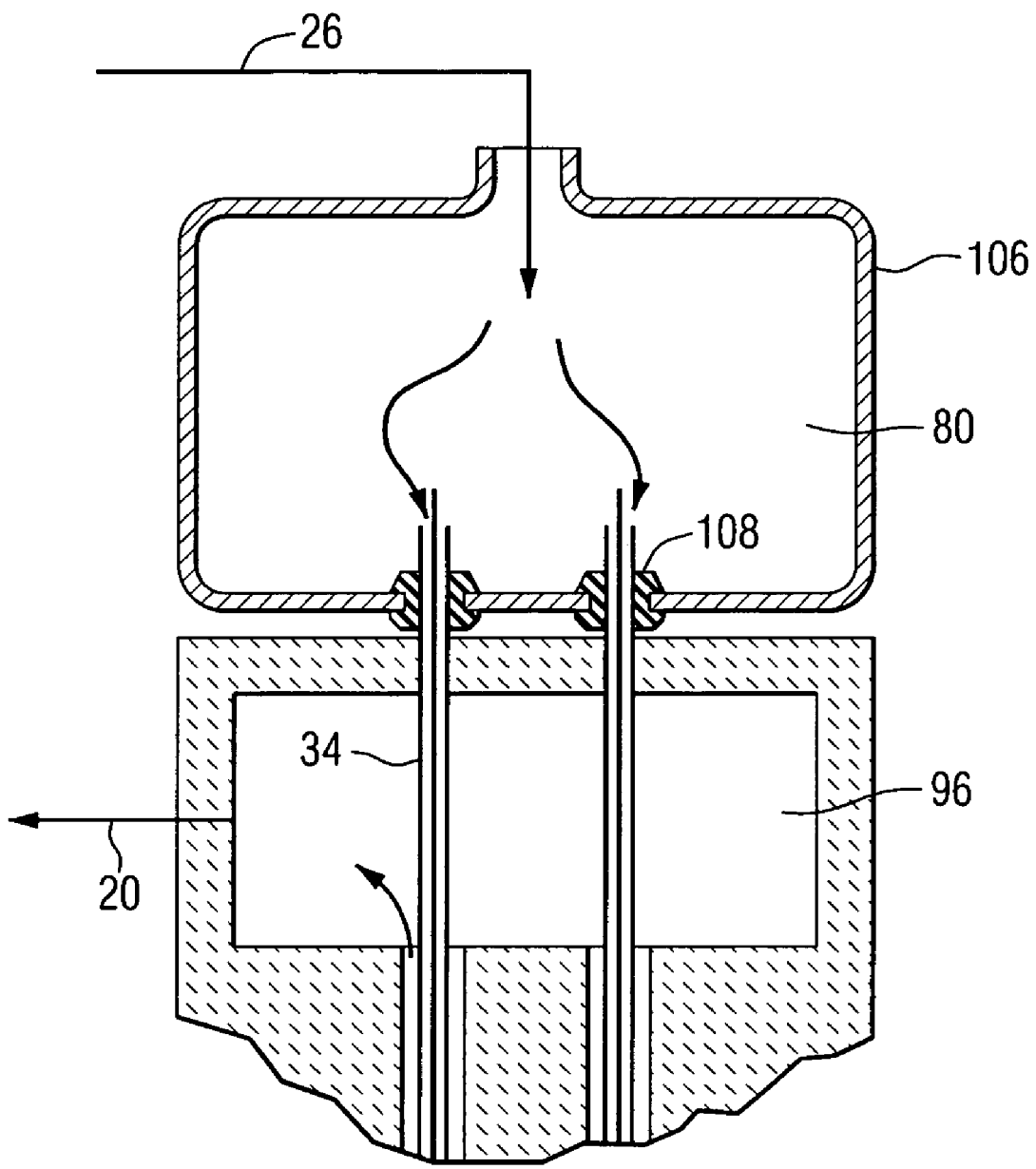
FIG. 4 shows a cross-sectional view of another embodiment of the invention featuring a possible separate attachable low temperature air delivery components.

FIG. 4 illustrates an alternate low temperature air manifold/plenum 80 design where a completely detachable plenum unit 106 can be inserted onto in place on top of alumina or mullite air feed tubes 34 using rubber grommets 108 or the like. This plenum unit 106 can be made of plastic or the like and is essentially isolated from the hot exhaust stream 20 and need be of only low temperature materials.

In FIGS. 2 and 3, to improve heat transfer to the process sir, round metallic inserts 90 can be hung from the open ends of the air feed tubes and extend downward within the tubes over a length at least equal to the air interior heat transfer zone 92. Because the lower section of each insert (enhancer) might reach a temperature close to 900° C., this component would be fabricated from a high alloy steel such as Inconel 600 or Inconel 601. The function of the insert 90 is two-fold. Firstly, the insert improves the convective heat transfer between the inside wall of the air feed tube and the air by reducing the hydraulic diameter of the passage. Secondly, when the temperature is high, the insert acts as a radiation fin insomuch as it collects heat by radiation from the inside wall of the air feed tube and transfers the heat by convection from its exterior surface to the air. In one of the means of accomplishing start-up heating which is described later, the lower part of the insert is an electric heating element and in this version the enhanced/heater assembly might extend within the air feed tube to a level below the top of the combustion chamber 38.

SOFC air flow rate requirements and convenient dimensional choices combine to establish the laminar flow regime within the air feed tubes 34 and within the annular exhaust passage space 98 over the entire range of generator operating conditions. Laminar flow in these passages is advantageous from the viewpoint of promoting stability of generator temperature as load conditions change. The rational follows. Laminar flow within a conduit connotes constant Nusselt number (Nu) (heat transfer coefficient (h) multiplied by passage hydraulic diameter ($d_e$) divided by thermal conductivity of the gas (k)) i.e., Nu=$h \cdot d_e/k$. Because the hydraulic diameter of the passage is fixed and since the gas thermal conductivity varies very little over the temperature range of interest, constant Nusselt number connotes constant convective heat transfer coefficient. Because the outcome of this will be seen to stabilize temperature the radiation component of heat transfer is also essentially constant. Thus the overall coefficient for heat transfer from the exhaust stream to the air feed stream, and the ability to sustain required heat exchanger terminal temperatures, is not materially affected by variations in the mass flow rates of the streams. Consequently, the interior recuperative heat exchanger is self regulating and the SOFC bundle to which the heat transfer is integrally connected is not overheated as the air flow rate is increased and is not subject to a significant reduction in temperature when air flow rate is reduced.

After passing through the zone 92 the air feed tube passes through the combustion chamber 38 before entering the SOFC 42. The air feed tube extends to within 2.5 cm (1 inch) of the bottom (closed) end of the SOFC (near point 100) at which point the air leaves the feed tube and rises in the annular passage 102 between the inside wall of the cell and the outside wall of the air feed tube. At the top (open) end of the cell the air is discharged into the combustion chamber 38 whereupon enough of the oxygen which was not consumed in the electrochemical process reacts with unburned fuel to form a high temperature mixture of nitrogen and unused oxygen (depleted air) and combustion products 67. When the fuel is a hydrocarbon the combustion products are water vapor and carbon dioxide. The depleted air/combustion product mixture rises and enters annular passages 98 which are formed by between holes in the ceramic block structure of the zone 92 and the outside diameter of the air feed tubes which pass through it. Heat transfer from the depleted air/combustion product mixture (exhaust stream) to the air feed tubes within each passage is by convection to the outside wall of the tube and by convection to the wall of the preheat block which then radiates heat to the air feed tube outside wall.

The zone 92 block structure might be formed from a stack of fibrous ceramic boards which are cemented together before being drilled to accept the air feed tubes, of the structure might be a net shape ceramic casting. The mass flow rate of the exhaust stream is only slightly higher than that of the air feed stream. The mean specific heats of the two streams is also very similar. Consequently, the temperature rise of the air within the zone 92 will be approximately 5% higher than the temperature fall of the exhaust stream. Accordingly, the temperature of the exhaust stream, as it leaves the heat transfer block zone and enters the exhaust plenum 96 is only slightly higher than the sum of the inlet air temperature and the temperature rise of the gases within the generator and combustion chamber. Measurements of exhaust stream temperature for a recently constructed 5 kW experimental generator which used the technology disclosed here place the temperature at approximately 300° C. (575° F.). The significance of this lies in the fact that only a modest thickness of insulation is required between the exhaust plenum and the plenum which is directly above it and which contains the rubber or elastomeric seal components of the air delivery system, shown primarily in FIGS. 3 and 4.

When the generator is started from ambient conditions the system usually requires a means of heating which elevates the temperature in the generator to a level at which the fuel cells become electrochemically active. At this point the generator is thermally self-sustaining and the start-up heating is discontinued. In order to preserve the advantages of low air delivery duct operating temperature and the option of highly effective inexpensive sealing of the air delivery components, the preheating energy source must be internal to the generator system, as opposed to present practice which utilizes an external start-up heater. The means of start-up heating described here preserve the option of using an elastomeric seal to prevent leakage to the exhaust plenum. Reference is drawn to two less preferable configurations which do not preserve this option. Alternatives shown in FIGS. 5-7, because they are electrically energized, preserve the desirable option to employ the heaters as power dissipaters when the generator is off-line.

Figure 5:
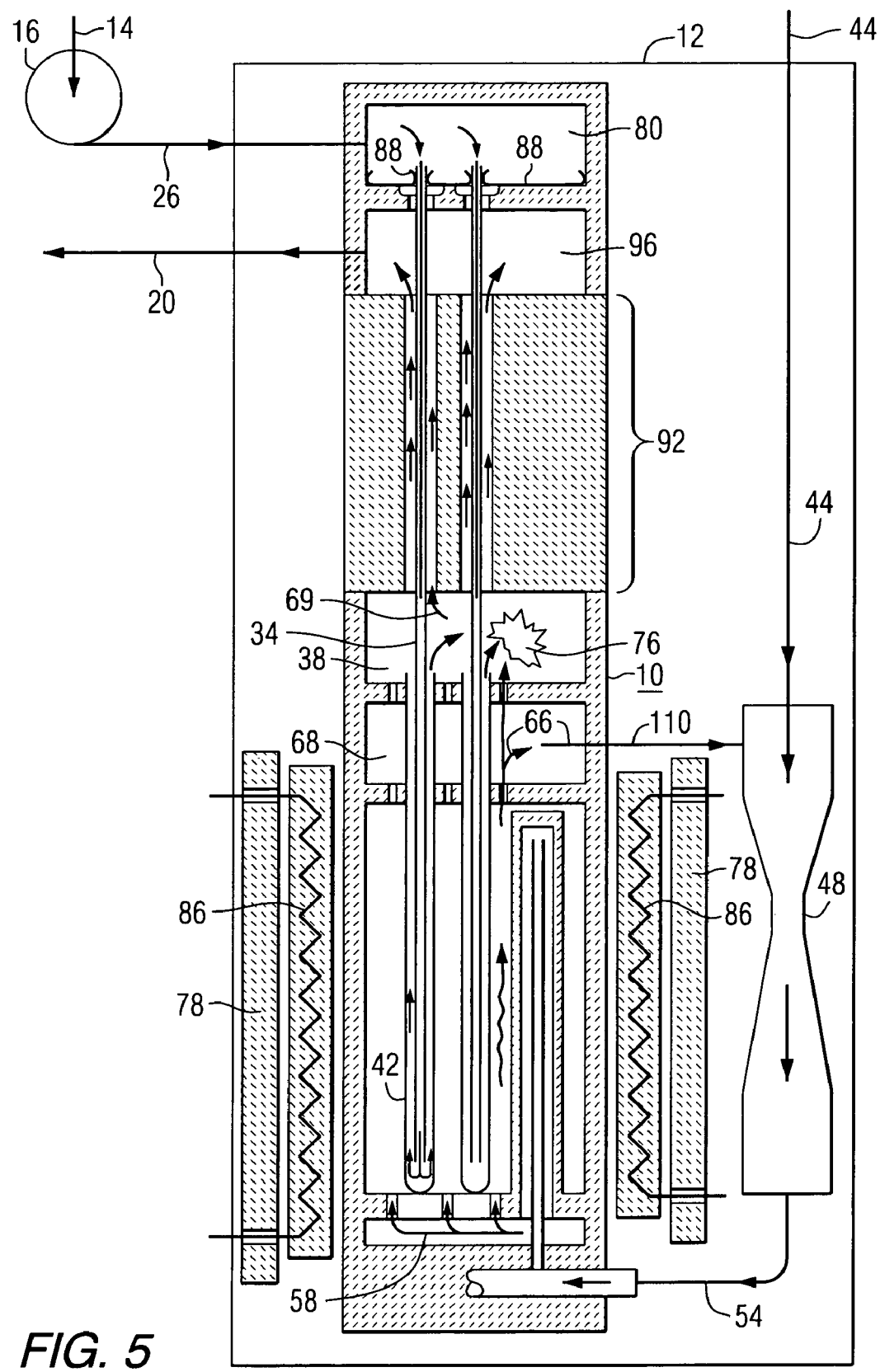
FIG. 5 shows a cross-sectional view of another embodiment of the invention featuring interior electrically energized heater panels.

A variety of start-up heating methodologies will now be described which are synergistic with the internal preheater insomuch as external air feed conduits and the air feed plenum can be fabricated from inexpensive low temperature materials and air leakage from feed plenum to exhaust plenum can be prevented through the use of elastomeric seals. One means of start-up heating is illustrated by FIG. 5. In this arrangement at least one electrically energized internal heater panel 86 surrounds at least the generator section/reaction chamber containing the fuel cells of the SOFC generator. Thermal insulation 78 limits the loss of heat to the external ambient. Uniformity of heating is promoted by activation of the fuel recirculation loop 110 from recirculation chamber 68. Motive energy for recirculation is provide by injection of a fuel feed 44 including a nitrogen/hydrogen ($N_2/H_2$) mixture through the motive gas nozzle of an ejector pump 48. Alternatively, a pump gas circulator (not shown) can be used. The hydrogen component of this mixture serves also to prevent oxidation of the fuel electrodes of the SOFC's. Activation of the air delivery systems also serves to promote uniform heating of the generator. This system preserves the option to use elastomeric seals 88 in the air delivery system and preserves the ability of the heaters to function as power dissipaters. An alternate means of start-up heating is where a blend of air and fuel gas is ignited within a burner assembly and the resulting product is introduced to the combustion chamber whereupon it flows into annular passages of the interior heat transfer zone/block 92 and heats the incoming air stream. This also preserves the option to use elastomeric seals in the air delivery system.

Figure 6:
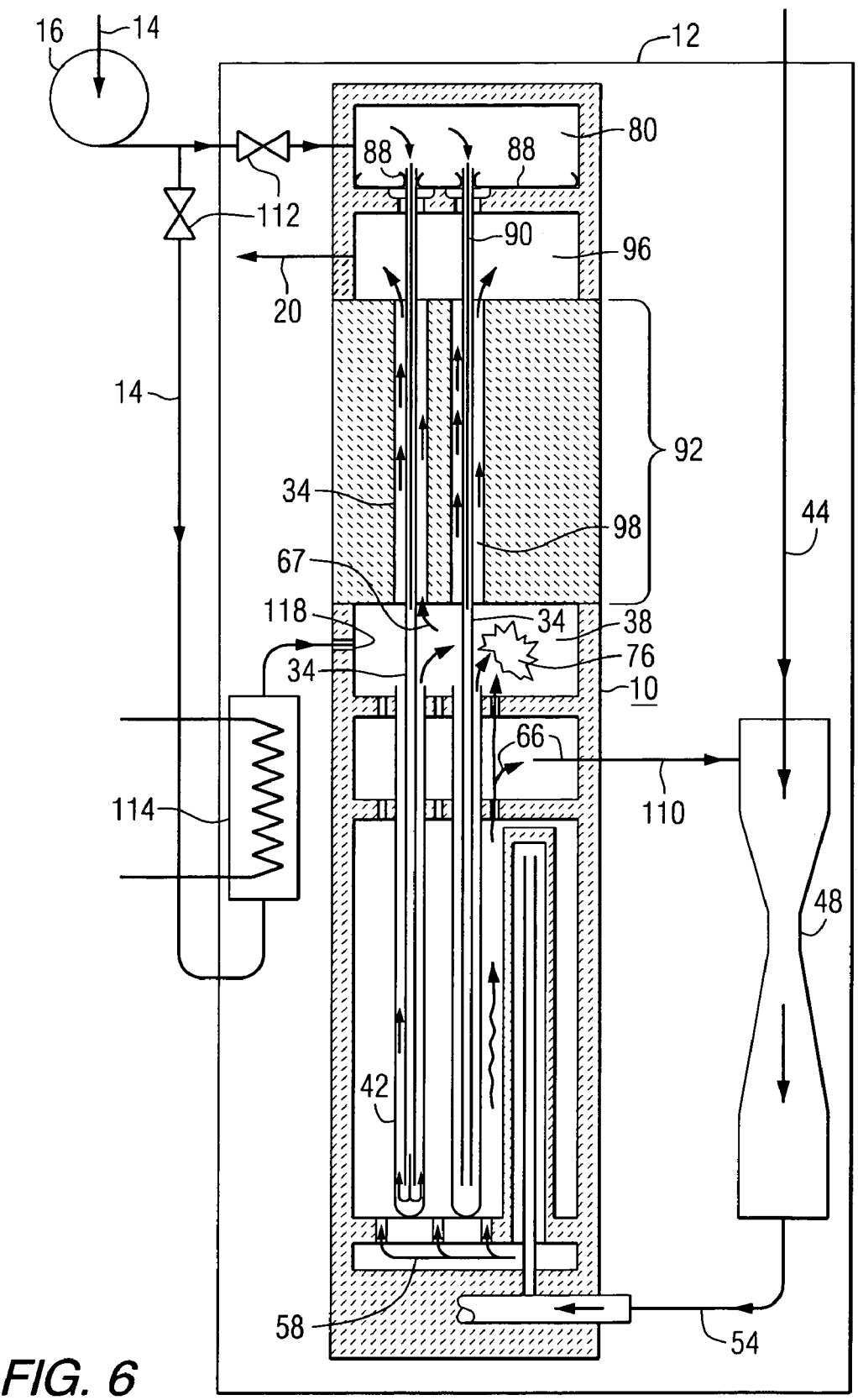
FIG. 6 shows a cross-sectional view of a preferred embodiment of the invention featuring an internal, electrically energized auxiliary start up heater and associated diverter valves.

Another means of start-up heating is illustrated by FIG. 6. In this arrangement approximately 50% of the air which is pumped by blower 16 is diverted by means of valves 112 through an electrically energized heater 114 into an opening 118 in the combustion chamber 38. It is noteworthy that the valves operate at low temperature at all times. The air is then discharged at high temperatures into the combustion chamber 38 whereupon it flows into annular passages 98 of the interior heat transfers zone/block 92 and heats the fraction of the air which takes the normal path of hot air deli very system. Recirculation of an $N_2/H_2$ mixture 110 serves to promote uniformity of heating and prevents oxidation of the fuel electrode of the SOFC's. This system preserves the option to use elastomeric seals in the air delivery system and preserves the ability of the heaters to function as power dissipaters.

Figure 7:
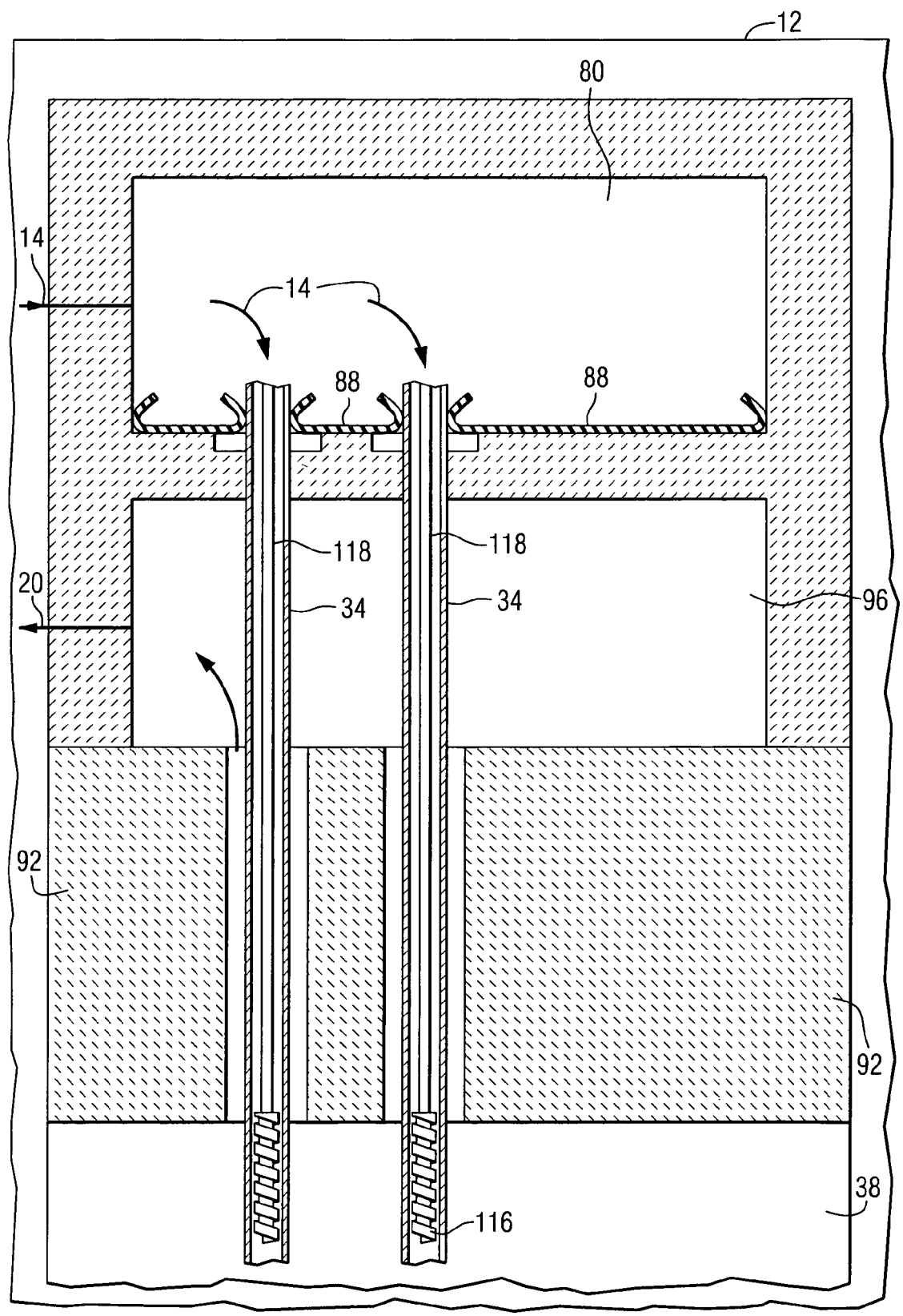
FIG. 7 shows an enlarged cross-sectional view of the generator of FIG. 6, featuring electrically energized heater inserts disposed within the air feed tubes.

Another means of start-up heating is illustrated by FIG. 7. In this arrangement inserts 116 which hang within the air feed tubes 34 serve as electrically energized heating elements and thus heat the incoming air 14. In all variants of the preheater design these inserts also serve to augment the overall thermal conductance between the exhaust stream and the incoming air. If it is desired to preserve the option of using an elastomeric seal material in the air delivery system, the uppermost portion 118 of the insert 116 would not be energized. Preferably the heated section of the insert 116 would be situated at the bottom interior heat transfer zone/block 92 and would extend within the air feed tube to a level below the top of the combustion chamber 38 so that the heated air within the feed tube is not substantially cooled by returning air which passes in countercurrent fashion with the annulus. Recirculation 110 of an $N_2/H_2$ mixture serves to promote uniformity of heating and prevents oxidation of the fuel electrode of the SOFC's. This alternative preserves the ability of the heaters to function as power dissipaters and is the preferred preheating alternative.

A variety of alternative configurations have been described. The current standard 250 kW (electric) SOFC generator is best exemplified schematically by FIG. 3 (process air sealing) and by FIG. 7 (start-up heating and dissipater). The following features provide advantages over previous practice Internal placement of the interior heat transfer zone/block allows all external air feed conduits to be fabricated from inexpensive, low temperature limit materials such as common steels, plastics, and fiberglass. This benefit extends also the air feed plenum which is directly upstream the preheater.

Placement of the interior heat transfer zone/block downstream of the air feed plenum permits the use of rubber or other elastomeric seals which prevent the unwanted leakage of feed air to the exhaust plenum.

Integral connection of the internal heat transfer zone/block and the SOFC bundle facilitates easily scalable modular construction of the generator with a reduced cost reward. The current preferred module design features individual air plena of fiberglass construction for each preheat module and each bundle. Start-up and power dissipater heaters are integral with the heat transfer enhancers and are placed coaxially within each air feed tube. Heaters might be of the cartridge type or of the low cost-wound wire resistance type.

The establishment of the laminar flow regime within all passages of the interior heat transfer zone/block promotes stability of temperature within the generator and avoids substantial temperature variations when generator load and air flow rate is changed.

The use of electrically energized start-up heaters permits the use of these heaters as a power dissipation means when the generator is off-line. The generator thus becomes self-heated and is maintained at operating temperatures when operated at a low power output offline mode. Unwanted temperature cycles are thus avoided.

Placement of the start-up heaters downstream of the air feed plenum results in low temperature operation of the air feed plenum and thus preserves the ability to use positive rubber of elastomeric seals within the air feed system.

Since numerous changes may be made in the above-described arrangements without departing from the spirit and scope thereof, it is intended that all matter contained in the foregoing be interpreted as illustrative, and not in a limiting sense.

The invention claimed is:

1. A high temperature solid oxide electrolyte fuel cell generator comprising:

a housing containing a top air manifold feed plenum, an air feed conduit which discharges inlet air into said manifold feed plenum, and associated air feed tubes which connect in a sealed manner to said manifold feed plenum through at least one flexible air feed transport tube, a fuel inlet, a reaction chamber containing fuel cells, and a separate reacted fuel-reacted air combustion chamber above the reaction chamber; wherein inlet air can be heated internally within the housing in at least one separate interior heat transfer zone located between the separate reacted fuel-reacted air combustion chamber and the air manifold feed plenum, where the separate interior heat transfer zone has the air feed tubes passing therethrough to the fuel cells, where there is an annular space around the air feed tubes within the interior heat transfer zone to pass a combusted exhaust product stream from the reacted fuel-reacted air combustion chamber, said annular space connecting to a separate exhaust chamber above the interior heat transfer zone and below the air manifold feed plenum.

2. The fuel cell generator of claim 1, wherein the feed air is ambient air, the air feed tubes, at least within the separate interior heat transfer zone contain interior inserts that collect heat by radiation from the inside wall of the air feed tube and transfer the heat by convection from its interior surface to the air in the air feed tube, and where the separate interior heat transfer zone is ceramic and is a recuperative interior heat exchanger, and said zone constitutes from about 10% to 20% of the length of the fuel cell generator.

3. The fuel cell generator of claim 1, wherein the air manifold feed plenum is made from low temperature materials useful below 800° C., selected from the group consisting of carbon steel, plastic, and fiberglass, the at least one flexible feed transport tube is made of silicon rubber or an elastomeric material useful below 800° C., where an internal, electrically energized heater is disposed adjacent the reaction chamber, and where the fuel cell generator does not utilize exterior gas feed heat exchangers or pre-heaters.

4. A high temperature solid oxide fuel cell generator comprising:

1.) a source of air and a source of fuel;

2.) a top air manifold feed plenum and an air feed conduit which discharges inlet air into said manifold feed plenum, and associated air feed tubes which connect in a sealed manner to said manifold feed plenum through at least one flexible air feed transport tube;

3.) a bottom fuel inlet plenum;

4.) a fuel electrochemical reaction chamber containing fuel cells;

5.) a recirculation chamber directly above the electrochemical reaction chamber in which a fraction of reacted and unreacted fuel are drawn into a recirculation loop;

6.) a separate combustion chamber directly above the recirculation chamber wherein fuel combustion products and reacted air from within the cells combine to complete combustion of the unburned fuel;

7.) at least one separate interior heat exchanger zone, in which the combustion products heat incoming air which is carried in ceramic air feed tubes, where the interior heat transfer zone passes air feed tubes therethrough to the fuel cells, where there is an annular space around the air feed tubes within the interior heat transfer zone to pass a combusted exhaust product stream from the separate combustion chamber, said annular space connecting to a separate exhaust chamber above the interior heat transfer zone; and 8.) a separate combustion products exhaust chamber which lies directly below the top air manifold feed plenum and above the separate interior heat transfer zone.

5. The fuel cell generator of claim 4, wherein the air manifold feed plenum is made from low temperature materials useful below 800° C., selected from the group consisting of carbon steel, plastic, and fiberglass, the at least one flexible air feed transport tube is made of silicon rubber or an elastomeric material useful below 800° C., and where the fuel cell generator does not utilize exterior gas feed heat exchangers or pre-heaters.

6. The fuel cell generator of claim 4, wherein at least the fuel electrochemical reaction chamber is surrounded by at least one internal heater panel.

7. The fuel cell generator of claim 4, wherein the interior of the ceramic air feed tubes within the interior heat exchanger zone contain at least one of metallic heat conducting inserts and electrically energized heater inserts.

8. The fuel cell generator of claim 4, wherein the source air is ambient air, the air feed tubes, at least within the separate interior heat transfer zone contain interior inserts that collect heat by radiation from the inside wall of the air feed tube and transfer the heat by convection from its interior surface to the air in the air feed tube, and where the separate interior heat transfer zone is ceramic and is a recuperative interior heat exchanger, and said zone constitutes from about 10% to 20% of the length of the fuel cell generator.

9. A high temperature, solid oxide electrolyte fuel cell generator comprising:
1.) a housing defining an air manifold feed plenum containing open tops ends of a plurality of air feed tubes;
2.) a source of air, and an air feed conduit which discharges inlet air into said manifold feed plenum;
3.) a source of fuel;
4.) a pump for pumping the inlet air directly into the air entry manifold feed plenum of the generator through the air feed conduit;
5.) a generator section within the bottom of the housing, containing a plurality of tubular fuel cells, each open at its top end, each having an exterior fuel electrode and an interior air electrode with solid oxide electrolyte therebetween, where the generator section connects to a source of fuel, and the plurality of air feed tubes are inserted within the fuel cells so that the pumped air can contact the air electrodes; and
6.) a separate reacted fuel-reacted air combustion chamber at the top open end of the fuel cells;
wherein the air passing through air feed tubes can be heated internally within the housing in at least one separate interior heat transfer zone, which is disposed between reacted fuel-reacted air combustion chamber and the air manifold feed plenum, where the separate interior heat transfer zone passes air feed tubes therethrough to the fuel cells, where there is an annular space around the air feed tubes within the interior heat transfer zone to pass a combusted exhaust product stream from the reacted fuel-reacted air combustion chamber, said annular space connecting to a separate exhaust chamber above the separate interior heat transfer zone.

10. The fuel cell generator of claim 9, wherein the air manifold feed plenum is made from low temperature materials useful below 800° C., selected from the group consisting of carbon steel, plastic, and fiberglass, the flexible feed transport tubes are made of silicon rubber or an elastomeric material useful below 800° C., and where the fuel cell generator does not utilize exterior gas feed heat exchangers or pre-heaters.

11. The fuel cell generator of claim 9, wherein at least the generator section is surrounded by at least one internal heater panel.

12. The fuel cell generator of claim 9, wherein the interior of the air feed tubes within the interior of the interior heat transfer zone contain at least one of metallic heat conducting inserts and electrically energized heater inserts.

13. The fuel cell generator of claim 9, wherein a diverter valve is associated with the air pump to pass air into an internal heater and then into the combustion chamber and interior heat transfer zone.

14. The fuel cell generator of claim 9, wherein the source air is ambient air, the air feed tubes, at least within the separate interior heat transfer zone contain interior inserts that collect heat by radiation from the inside wall of the air feed tube and transfer the heat by convection from its interior surface to the air in the air feed tube, and where the separate interior heat transfer zone is ceramic, and is a recuperative interior heat exchanger, and said zone constitutes from about 10% to 20% of the length of the fuel cell generator.

15. A method of operating a high temperature solid oxide electrolyte fuel cell generator which reacts feed fuel and feed oxidant at interior fuel cell surfaces comprising:
1.) feeding oxidant into at least one separate interior heat transfer zone within the fuel cell generator through oxidant feed tubes, where said zone contains oxidant feed tubes therethrough which pass to fuel cells, and where there is an annular space around the oxidant feed tubes within said zone;
2.) contacting the oxidant feed tubes within the at least one separate interior heat transfer zone with exhaust spent fuel and spent oxidant products from a separate combustion chamber disposed above the fuel cells and below the separate interior heat transfer zone, which spent products pass through the annular space around the oxidant feed tubes to a separate exhaust chamber above the interior heat transfer zone; and then
3.) exhausting cooled exhaust from the fuel cell generator.

16. The method of claim 15, wherein before step 1, oxidant is pumped into a top air manifold feed plenum made from low temperature materials, useful below 800° C.

17. The method of claim 15, wherein before step 1, exterior gas feed heat exchangers or pre-heaters are not utilized, the oxidant is at ambient temperature, and where there is a laminar flow within the oxidant feed tubes and within the annular space around the oxidant feed tubes.

* * * * *